United States Patent
Bauman et al.

(10) Patent No.: US 11,623,413 B2
(45) Date of Patent: Apr. 11, 2023

(54) METHOD FOR MANUFACTURING A COMPRESSED INSULATION PANEL FOR A VACUUM INSULATED STRUCTURE

(71) Applicant: WHIRLPOOL CORPORATION, Benton Harbor, MI (US)

(72) Inventors: Gregory Edward Bauman, Stevensville, MI (US); Kevin Jay Cox, Benton Harbor, MI (US); Gustavo Frattini, St. Joseph, MI (US); Lynne F. Hunter, Dorr, MI (US); Ryan Daniel Kannegieter, Grand Rapids, MI (US); Rafael Dutra Nunes, St. Joseph, MI (US); Subrata Shannigrahi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 167 days.

(21) Appl. No.: 17/245,802

(22) Filed: Apr. 30, 2021

(65) Prior Publication Data

US 2022/0347939 A1   Nov. 3, 2022

(51) Int. Cl.
*B29C 65/02* (2006.01)
*B29C 70/02* (2006.01)
*B29C 70/88* (2006.01)
*B29K 105/08* (2006.01)

(52) U.S. Cl.
CPC .......... *B29C 70/021* (2013.01); *B29C 65/02* (2013.01); *B29C 70/88* (2013.01); *B29K 2105/0845* (2013.01); *B29K 2995/0015* (2013.01)

(58) Field of Classification Search
CPC .............................................. B29K 2995/0015
See application file for complete search history.

(56) References Cited

U.S. PATENT DOCUMENTS

| | | | |
|---|---|---|---|
| 5,044,705 A * | 9/1991 | Nelson | F24H 9/02 312/228 |
| 5,273,801 A | 12/1993 | Barry et al. | |
| 5,327,703 A | 7/1994 | Cur et al. | |
| 5,331,789 A * | 7/1994 | Cur | B65B 31/024 53/527 |
| 6,266,941 B1 | 7/2001 | Nishimoto | |
| 8,281,558 B2 * | 10/2012 | Hiemeyer | F16L 59/065 53/436 |
| 8,871,323 B2 | 10/2014 | Kim et al. | |
| 9,849,405 B2 | 12/2017 | Smith | |
| 10,139,035 B2 | 11/2018 | Smith | |
| 10,605,519 B2 | 3/2020 | Allo et al. | |

(Continued)

FOREIGN PATENT DOCUMENTS

| | | |
|---|---|---|
| EP | 1926931 B1 | 12/2009 |
| EP | 2615042 A1 | 7/2013 |

(Continued)

*Primary Examiner* — Jeffry H Aftergut
(74) *Attorney, Agent, or Firm* — Price Heneveld LLP

(57) ABSTRACT

A method for manufacturing an insulation member for an appliance includes the steps of forming a porous bag with a woven fabric, filling the porous bag with insulation materials, heat sealing the porous bag, vibrating the porous bag to define a pillow, compressing the pillow within a mold to define a compressed insulation member, and evacuating the compressed insulation member within an insulated structure to define a vacuum insulated structure.

20 Claims, 15 Drawing Sheets

(56) References Cited

U.S. PATENT DOCUMENTS

| | | |
|---|---|---|
| 10,876,786 B2 | 12/2020 | Jung et al. |
| 2011/0120620 A1* | 5/2011 | Hiemeyer ............ F16L 59/065 156/70 |
| 2015/0147514 A1 | 5/2015 | Shinohara et al. |

FOREIGN PATENT DOCUMENTS

| | | |
|---|---|---|
| WO | 2012031789 A1 | 3/2012 |
| WO | 2017112125 A1 | 6/2017 |

* cited by examiner

METHOD FOR MANUFACTURING A COMPRESSED INSULATION PANEL FOR A VACUUM INSULATED STRUCTURE

BACKGROUND OF THE DISCLOSURE

The present disclosure generally relates to a vacuum insulated structure, and more specifically, to a compressed insulation panel for a vacuum insulated structure.

SUMMARY OF THE DISCLOSURE

According to one aspect of the present disclosure, a method for manufacturing an insulation member for a vacuum insulated structure includes the step of forming a bag with a single layer porous fabric, wherein the bag is free from metallic and plastic films. The method further includes the steps of filling the bag with insulation materials, sealing the insulation materials within the bag, vibrating the insulation materials and the bag to define a pillow, compressing the pillow within a mold to define a compressed insulation panel, positioning the compressed insulation panel in an insulation cavity that is defined between a first panel and a second panel, and evacuating the insulation cavity and the compressed insulation panel to define said vacuum insulated structure.

According to another aspect of the present disclosure, a method for manufacturing an insulation member for an appliance includes the steps of forming a porous bag with a woven fabric, filling the porous bag with insulation materials, heat sealing the porous bag, vibrating the porous bag to define a pillow, compressing the pillow within a mold to define a compressed insulation member, and evacuating the compressed insulation member within an insulated structure to define a vacuum insulated structure.

According to yet another aspect of the present disclosure, a method for manufacturing a vacuum insulated structure for an appliance includes the steps of forming a porous bag containing insulation materials, densifying the insulation materials to define a pillow, compressing the pillow to define a compressed insulation member, disposing the compressed insulation member within an insulation cavity that is defined between a wrapper and a liner, and evacuating the compressed insulation member and the insulation cavity to define an at least partial vacuum.

These and other features, advantages, and objects of the present disclosure will be further understood and appreciated by those skilled in the art by reference to the following specification, claims, and appended drawings.

Figure 1:
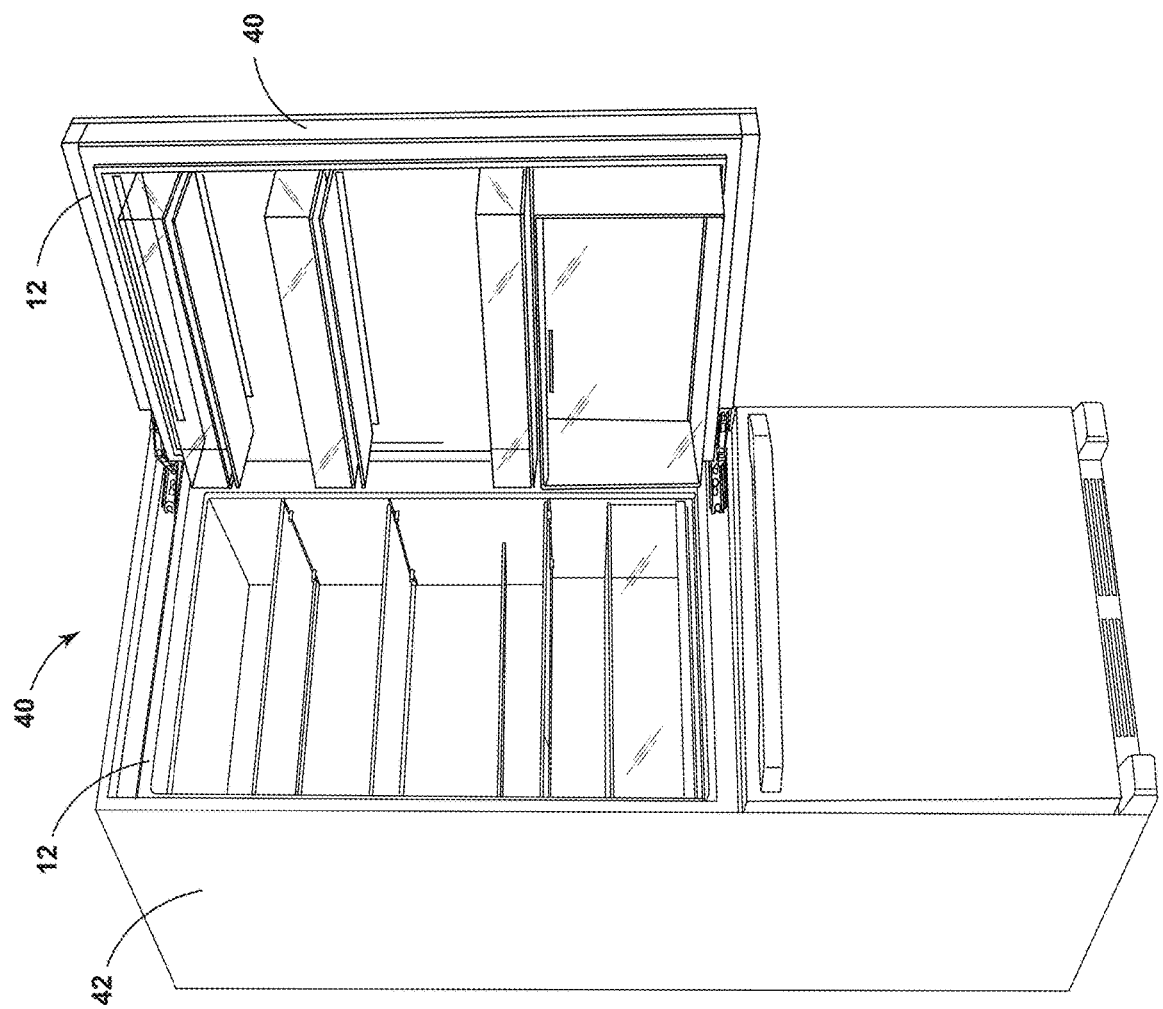
FIG. 1 is a front perspective view of an appliance of the present disclosure.
Figure 2:
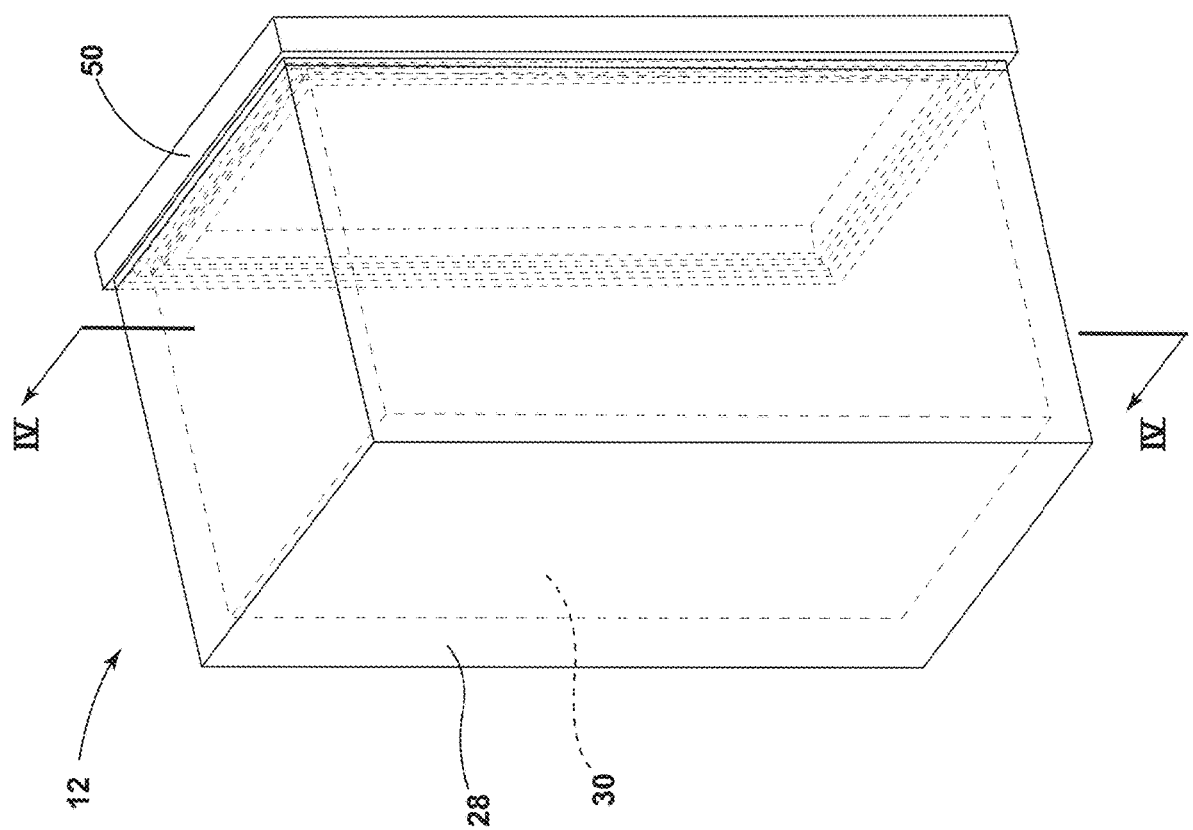
FIG. 2 is an expanded top perspective view of a vacuum insulated structure of the present disclosure.
Figure 3:
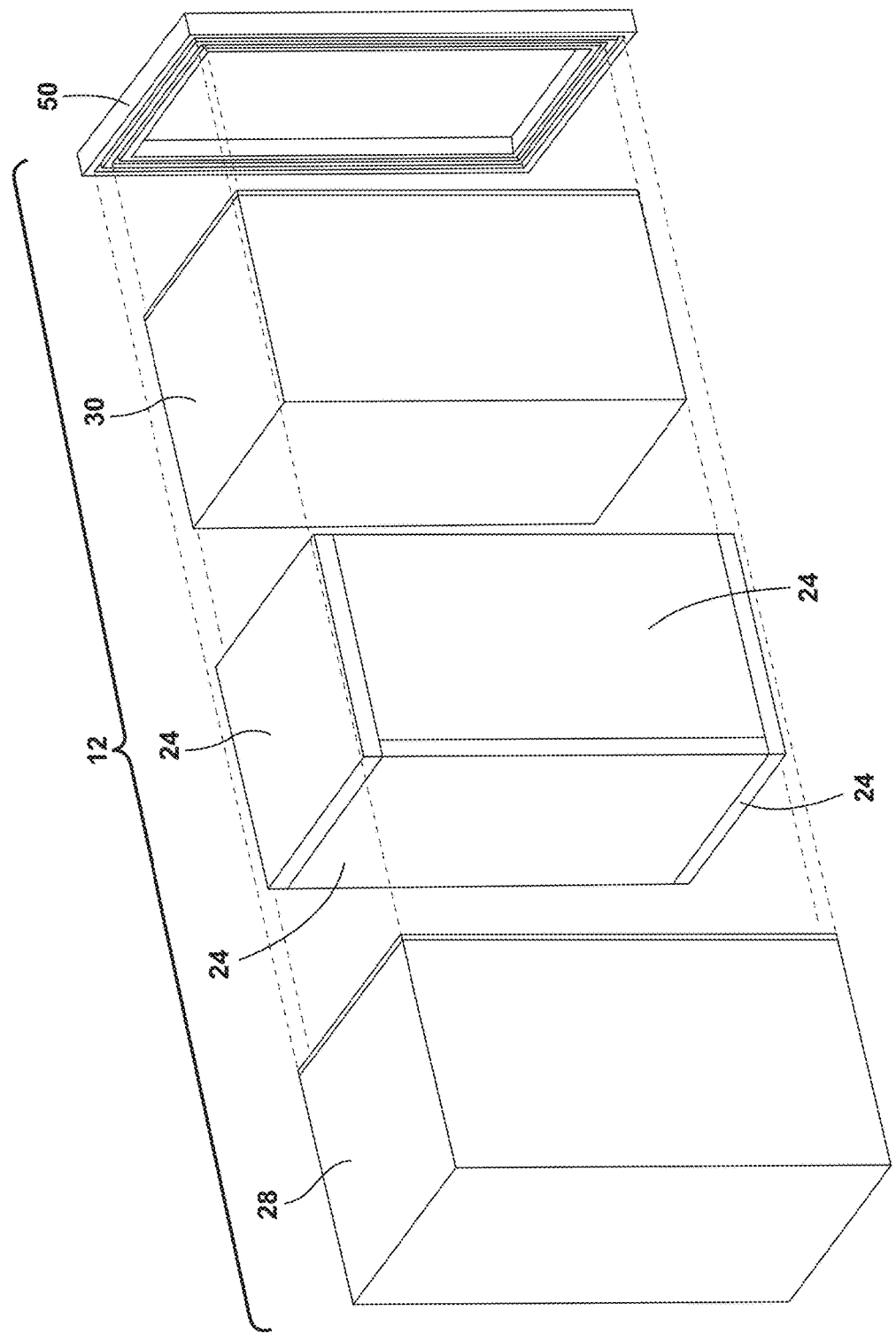
FIG. 3 is a top perspective view of a vacuum insulated structure of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a compressed insulation panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-15, reference numeral 10 generally designates an insulation member for a vacuum insulated structure 12. A bag 14 is formed with a single layer porous fabric 16 and is free from metallic and plastic films. The bag 14 is filled with insulation materials 18, and the insulation materials 18 are sealed within the bag 14. The insulation materials 18 and the bag 14 are vibrated to define a pillow 20. The pillow 20 is compressed within a mold 22 to define a compressed insulation panel 24. The compressed insulation panel 24 is positioned in an insulation cavity 26 defined between a first panel 28 and a second panel 30. The insulation cavity 26 and the compressed insulation panel 24 are evacuated to define the vacuum insulated structure 12.

Referring now to FIGS. 1-4, the vacuum insulated structure 12 is illustrated as part of an appliance 40. The appliance 40 is illustrated as a refrigerating appliance, but it is also contemplated that the vacuum insulated structure 12 described herein can be used with a variety of appliances. Moreover, the vacuum insulated structure 12 may be in the form of a vacuum insulated structural cabinet and/or a vacuum insulated panel that may be used as an insulation member for the appliance 40. For example, the appliance 40 is illustrated with a door 42 coupled to a cabinet 44 of the appliance 40. The vacuum insulated structure 12 may be utilized in various forms within either or both of the door 42 and the cabinet 44. It is generally contemplated that the vacuum insulated structure 12 is in the form of a panel when utilized for the door 42, and the vacuum insulated structure 12 is in the form of a structural cabinet when utilized for the cabinet 44.

According to various examples, the vacuum insulated structure 12 includes the first panel 28 and the second panel 30, mentioned above. The first panel 28 and the second panel 30 are typically formed from a metallic material, which minimizes potential exposure of the insulation cavity 26 to air molecules. Stated differently, the first and second panels 28, 30 can minimize the potential outgassing of the insulation cavity 26 as a result of the metallic material. The first and second panels 28, 30 may take the form of a liner and a wrapper, respectively, when the vacuum insulated structure 12 is utilized for the cabinet 44. The first panel 28 and the second panel 30 each have an interior surface 46 and an exterior surface 48.

Figure 4:
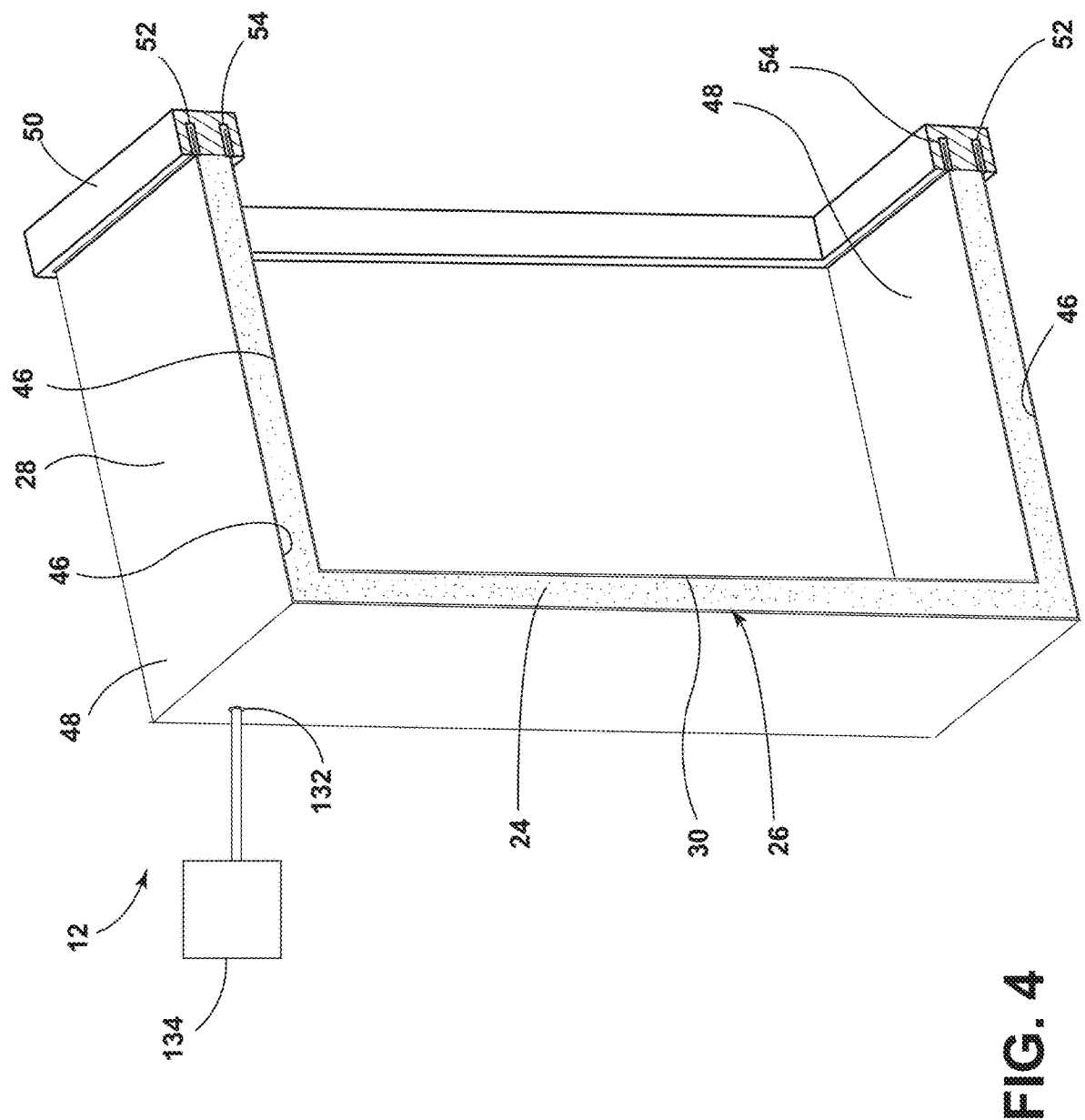
FIG. 4 is a cross-sectional view of the vacuum insulated structure of FIG. 2 taken along lines IV-IV.
Figure 5:
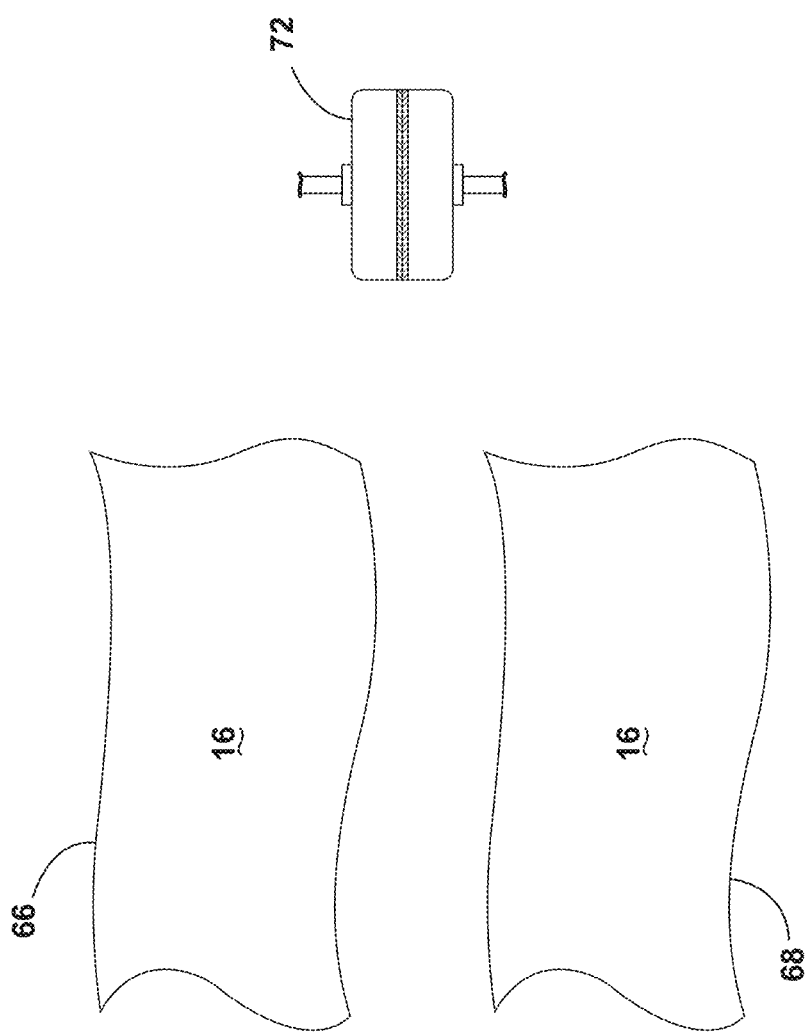
FIG. 5 is a schematic view of a first fabric portion, a second fabric portion, and a coupling assembly of the present disclosure.
Figure 6:
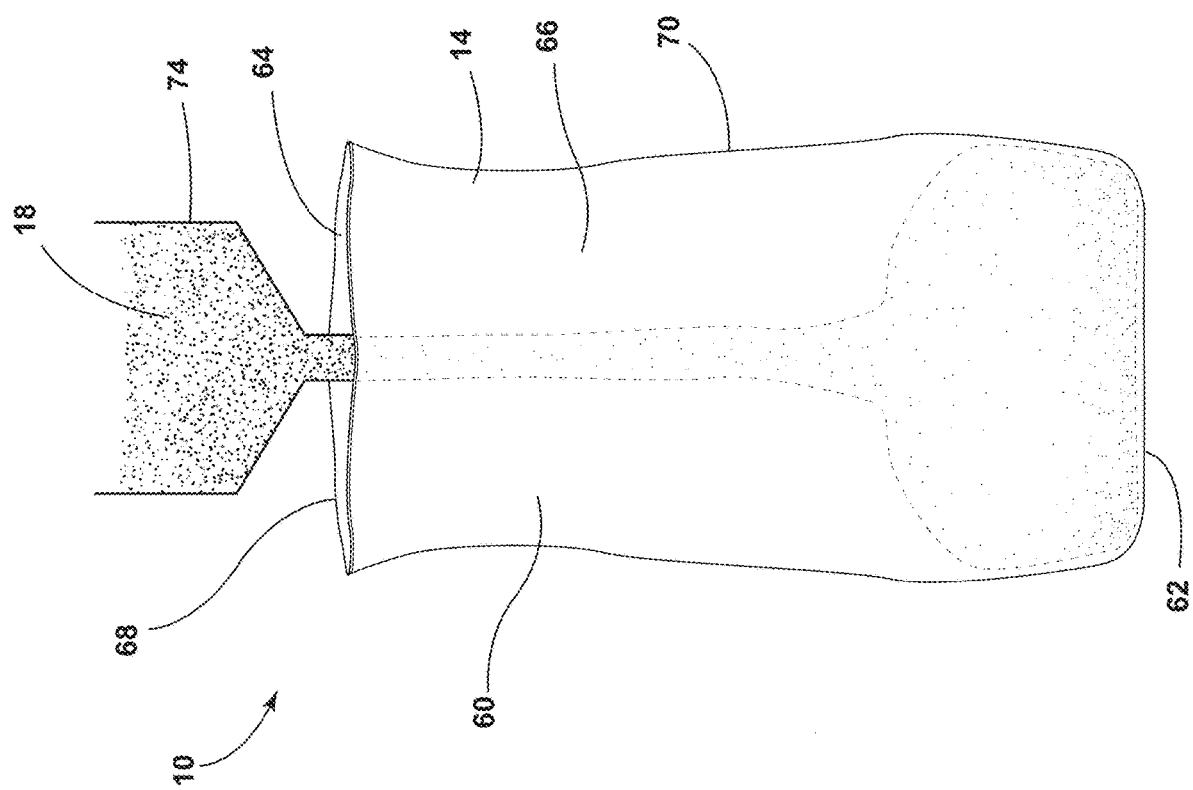
FIG. 6 is representative of a bag being filled with insulation materials of the present disclosure.

With further reference to FIGS. 1-4, it is generally contemplated that the interior surface 46 of each of the first and second panels 28, 30 at least partially defines the insulation cavity 26 in which the insulation member 10 is disposed. The insulation cavity 26 is sealed and further defined by a trim breaker 50. It is generally contemplated that the trim breaker 50 is formed from a polymeric material, such as plastic. As illustrated in FIG. 4, the first panel 28 is disposed within a first groove 52 of the trim breaker 50, and the second panel 30 is disposed within a second groove 54 of the trim breaker 50. The trim breaker 50 is configured to assist in the maintenance of the at least partial vacuum that is defined within the insulation cavity 26, described further below.

Referring now to FIGS. 3-6, the bag 14 is illustrated with sidewalls 60, a base 62, and an opening 64. As mentioned above, it is generally contemplated that the bag 14 is formed from the porous fabric 16, such that the bag 14 may be referred to as a porous bag 14. By way of example, not limitation, the porous fabric 16 may be a closed-cell woven fabric, such as a polypropylene. Stated differently, the porous fabric 16 may be a closed-cell bonded mesh. As also mentioned above, the porous fabric 16 is a fabric material that is generally free from a plastic and/or metal film and/or coating. The porous fabric 16 is a single layer fabric that is capable of drawing air through the sidewalls 60. The porous fabric 16 is free from any separate coatings or films that would otherwise seal the sidewalls 60 of the bag 14 and, as such, is free from plastic or metal coatings typically found in such sealing coatings or films. The bag 14 can be formed by sealing or otherwise coupling a first fabric portion 66 and a second fabric portion 68 to define the base 62 and the sidewalls 60 of the bag 14. For example, the first fabric portion 66 can be aligned with the second fabric portion 68, such that edges 70 of the first and second fabric portions 66, 68 can at least partially overlap. The edges 70 of the first and second fabric portions 66, 68 can then be heat sealed and/or sewn to form the bag 14 via a coupling assembly 72. It is generally contemplated that the coupling assembly 72 may be a heat sealing assembly in which the first and second fabric portions 66, 68 can be positioned to seal the edges 70.

Additionally or alternatively, the first fabric portion 66 may form the sidewalls 60 of the bag 14, and the second fabric portion 68 may form the edges 70 and the base 62 that couple the sidewalls 60 together. In such configuration, it is generally contemplated that the first fabric portion 66 is formed from a first closed-cell woven fabric, and the second fabric portion 68 is formed from a second closed-cell woven fabric. The first closed-cell woven fabric of the first fabric portion 66 may be formed from a closed-cell woven fabric that is generally different from the second closed-cell woven fabric of the second fabric portion 68. The use of different closed-cell woven fabrics for each of the first fabric portion 66 and the second fabric portion 68 may be strengthen the overall construction of the bag 14. The configuration of the bag 14 with the first and second fabric portions 66, 68 assists in the retention of the final form of the compressed insulation member 24 as formed within the mold 22, described below. The closed-cell nature of the first and second fabric portions 66, 68 assists in retaining the insulation materials 18 within the bag 14, while still allowing evacuation of any potential air or other gasses present in the bag 14 after the bag 14 is sealed. As mentioned above, the bag 14 has the opening 64, such that three sides of the first and second fabric portions 66, 68 are sealed to form the bag 14.

With further reference to FIGS. 3-6, the bag 14 is filled with the insulation materials 18, as mentioned above, to ultimately define the pillow 20. The insulation materials 18 are deposited through the opening 64 of the bag 14 via a hopper 74 or other distribution devices until the insulation materials 18 and the bag 14 define a predetermined weight. The weight of the bag 14 with the insulation materials 18 may vary depending on the intended use within the vacuum insulated structure 12. By way of example, not limitation, the insulation materials 18 can be comprised of a low-density powder with a relative density ranging between approximately 70 kg/m$^3$ to 120 kg/m$^3$. Additionally or alternatively, the relative density of the insulation materials 18 can be less than 70 kg/m$^3$ and/or greater than 120 kg/m$^3$. The relative density of the insulation materials 18 may correspond to a predetermined weight of the insulation materials 18 to be disposed within the bag 14.

It is generally contemplated that the insulation materials 18 may be comprised of a black carbon powder. It is also contemplated that the insulation materials 18 may be comprised of, but not limited to, fumed silica with or without any radiation dispersing materials, silica powders, precipitated silica, hydrophobic silica, glass fibers, glass microspheres, perlite materials, granulated silica, other silica material, and/or any combination of the insulation materials 18 set forth herein.

Referring now to FIGS. 4-7, the insulation materials 18 are dispensed into the opening 64 of the bag 14 via the hopper 74, and the bag 14 can be sealed via the coupling assembly 72 once the predetermined weight of the bag 14 and the insulation materials 18 is achieved. The opening 64 of the bag 14 can be sealed using the same heat sealing method used during formation of the bag 14. Additionally or alternatively, the opening 64 of the bag 14 may be sealed via sewing or other methods of sealing the porous bag 14. As mentioned above, the porous bag 14 is configured to allow air and/or other gasses to pass through the sidewalls 60 of the bag 14 while retaining the insulation materials 18 within the bag 14. The porous bag 14 and the insulation materials 18 can be evacuated, such that the air and/or other gas particles present within the bag 14 and the insulation materials 18 can be evacuated and removed through, at least, the sidewalls 60 of the porous bag 14, as described further below.

While the bag 14 is porous to assist in evacuation of air within the bag 14 and the insulation materials 18, the bag 14 is sufficiently solid to retain the insulation materials 18 within the bag 14, as mentioned above. Stated differently, the insulation materials 18 are contained within the bag 14 during evacuation of the porous bag 14 and the insulation materials 18, described further below. As a result of the closed-cell woven fabric of the bag 14, air and/or other gasses may remain present within the insulation materials 18 even after the sidewalls 60 of the bag 14 are sealed. The insulation materials 18, as deposited within the bag 14, are generally considered to be low density insulation materials 18. The insulation materials 18 may be further densified to increase the thermal insulation of the insulation materials 18, described below.

Figure 7:
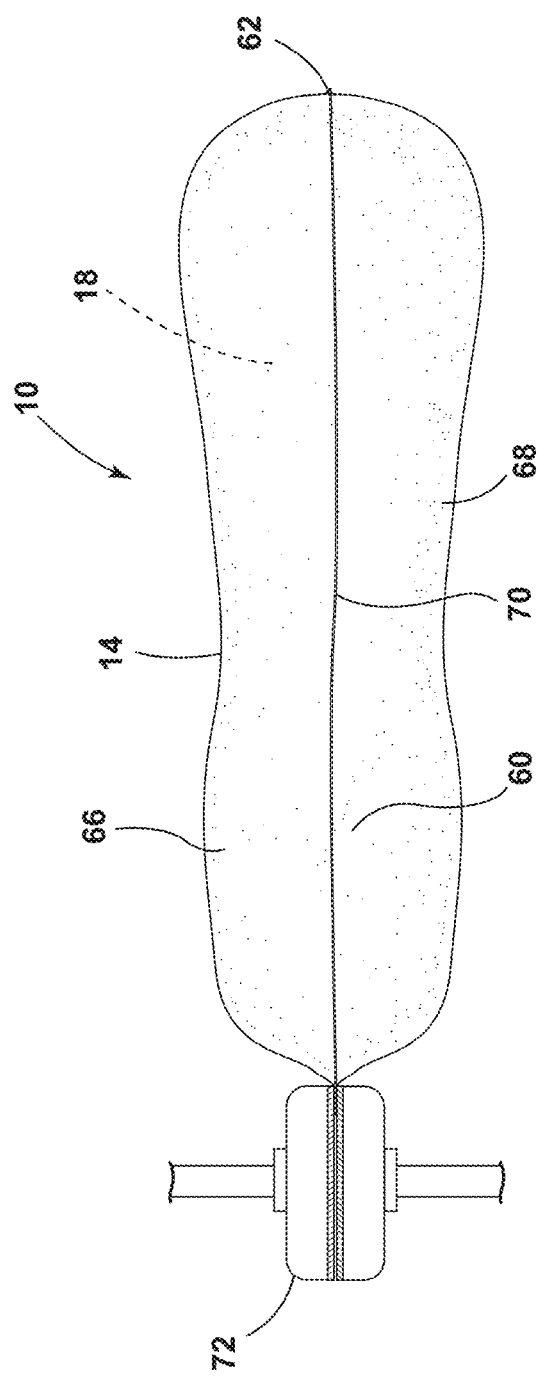
FIG. 7 is representative of a bag of the present disclosure being sealed with a coupling assembly.

Referring now to FIGS. 5-9, the bag 14 containing the insulation materials 18 is positioned and/or disposed on a vibrating assembly 80. The vibrating assembly 80 includes a vibration surface 82 operably coupled to a stationary surface 84 via at least one biasing member 86. As illustrated in FIG. 7, the vibrating assembly 80 includes first and second biasing members 86a, 86b and a motor 88 each operably coupled to the vibration surface 82. The motor 88 may be configured to be communicatively coupled to a controller 90 that is configured to activate and deactivate the motor 88. The controller 90 may include an algorithm that corresponds with the particular intended use of the insulation member 10 that is ultimately formed. For example, the controller 90 may activate the motor 88 to vibrate the pillow 20 until the insulation materials 18 reach a predetermined density. It is further contemplated that the vibration surface 82 may be configured with sensors 92 to detect the altered density of the pillow 20. The sensors 92 are communicatively coupled to the controller 90, such that the controller 90 may deactivate the motor 88 upon detection of the predetermined density by the sensors 92.

Vibration of the bag 14 and the insulation materials 18 can assist in the overall compaction and/or densification of the insulation materials 18 within the bag 14. For example, the density of the insulation materials 18 can be increased as the individual insulation particles are repositioned into a more densified state within the bag 14. The bag 14 and the insulation materials 18 can be shaken, vibrated, and otherwise manipulated on the vibrating surface 82 in order to manipulate the insulation materials 18 into the more densified state. The vibration of the insulation materials 18 is configured to de-aerate the insulation materials 18. The de-aeration of the insulation materials 18 minimizes the overall draw and compression of the mold 22 to form the insulation member 10. The vibration of the insulation materials 18 and the bag 14 to densify the insulation materials 18 defines the pillow 20, mentioned above. The pillow 20 is formed once the insulation materials 18 are densified during the vibration of the bag 14 on the vibration surface 82. As mentioned above, it is generally contemplated that the pillow 20 may contain air between the sidewalls 60 of the bag 14 even with the newly densified insulation materials 18. The vibrating assembly 80 is configured to densify the insulation materials 18 to be evacuated at a later time, described below. In this condition, the pillow 20 is not yet evacuated to remove the air particles and other gases that may be present within the pillow 20 and, more specifically, the insulation materials 18.

With further reference to FIGS. 5-10, the pillow 20 is positioned within the mold 22 that is configured to compress the pillow 20 to define the insulation member 10. It is generally contemplated that the mold 22 may form the insulation member 10 in either configuration of the compressed insulation panel 24 and/or compressed insulation member 24. The term compressed insulation member 24 is typically used to describe the utilization of the insulation member 10 within a three-dimensional structure, such as the cabinet 44 of the appliance 40. It is alternatively contemplated that the term compressed insulation member 24 can also refer to the use of the insulation member 10 within the door 42 of the appliance 40. Typically, the term compressed insulation panel 24 is utilized when referring to the positioning of the insulation member 10 within the door 42 of the appliance 40. It is also contemplated that the term compressed insulation panel 24 may be used when the insulation member 10 is positioned within the cabinet 44 of the appliance 40, mentioned below.

Figure 8:
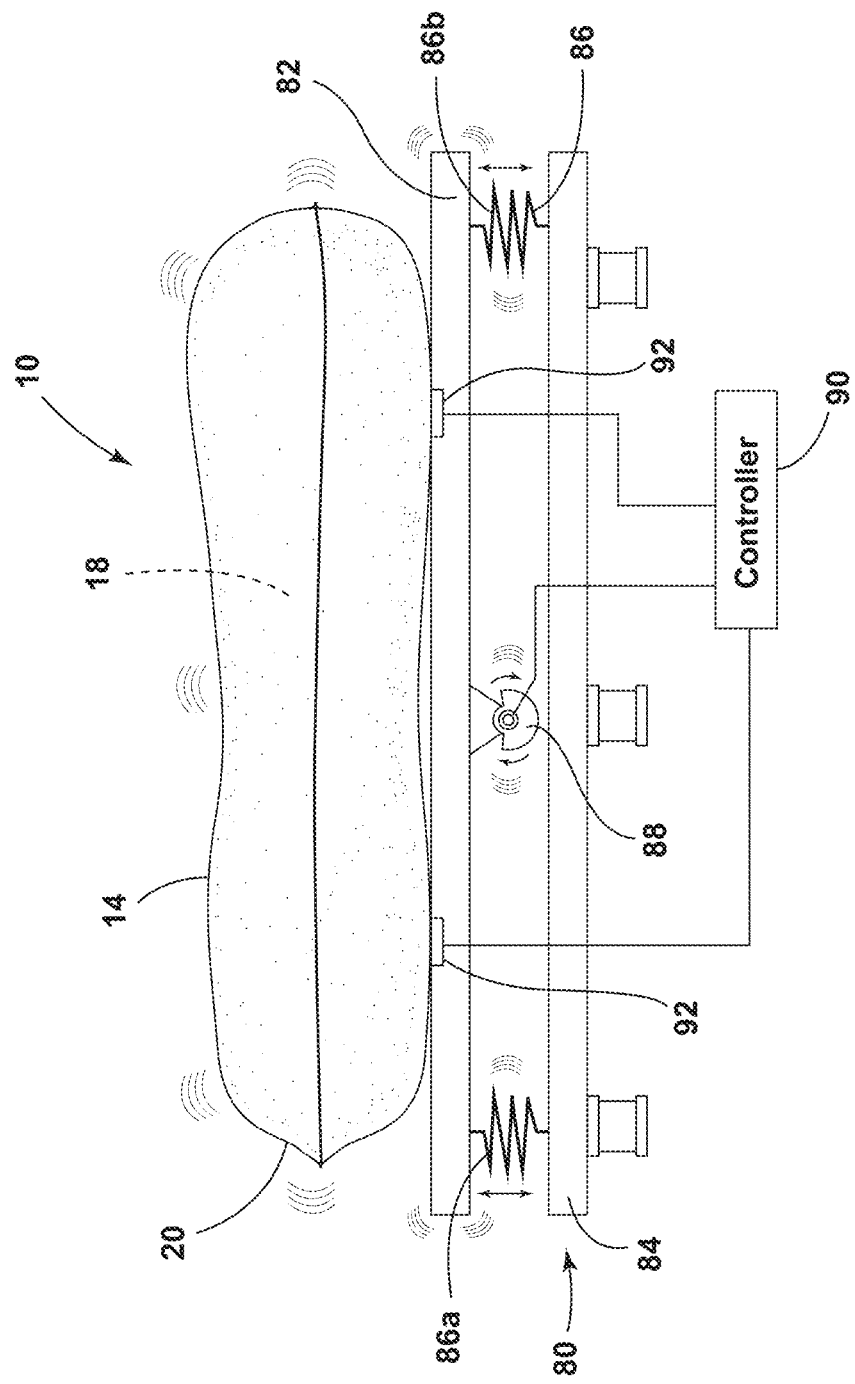
FIG. 8 is a schematic view of a bag of the present disclosure disposed on a vibrating assembly.
Figure 9:
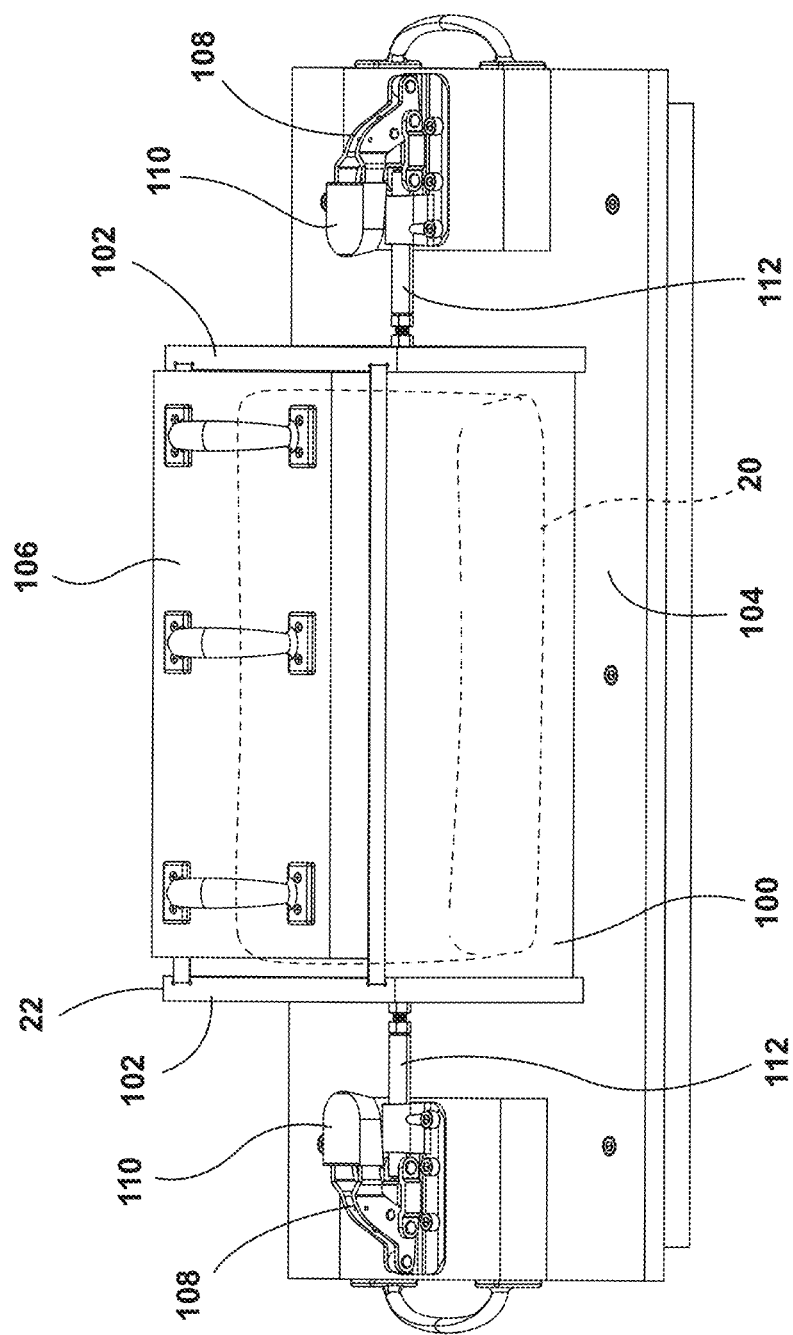
FIG. 9 is a side perspective view of a mold of the present disclosure in which a pillow of the present disclosure is disposed and illustrated in phantom.

The mold 22 includes a body 100 that has side portions 102, a base portion 104, and a cover portion 106. It is generally contemplated that the depicted mold 22 illustrated in FIG. 8 is a single example of a type of mold 22 that may be used for forming the insulation member 10. As generally mentioned above, the insulation member 10 may take the form of either a compressed insulation panel 24 and/or a compressed insulation member 24. While the depicted mold 22 is illustrated as forming the compressed insulation member 24, it is also contemplated that alternative configurations of the mold 22 may be used to form the compressed insulation member 24. The pillow 20 can be placed within the body 100 of the mold 22. The side portions 102 can be adjusted or otherwise altered to retain the pillow 20 within the mold 22. For example, the mold 22 also includes levers 108 that can be utilized to brace the side portions 102 along the base portion 104. The levers 108 each include a handle 110 and rods 112. The handle 110 can be manipulated to articulate the rods 112 against the side portions 102. It is contemplated that the cover portion 106 can be utilized to compress the pillow 20 within the mold 22, described below.

With further reference to FIGS. 5-10, the cover portion 106 includes a press 114 that can compress the pillow 20 to define the compressed insulation member 24. For example, the press 114 engages the pillow 20 upon activation of the press 114. The press 114 is released from the cover portion 106 and compresses a center portion 116 of the pillow 20 to form the insulation member 10. The engagement of the pillow 20 by the press 114 can compress the pillow 20 to define the compressed insulation member 24. The depicted mold 22 can form the compressed insulation member 24 as a result of the direction of the compression. Additionally or alternatively, the cover portion 106 may compress downward on the pillow 20. For example, the cover portion 106 may be articulated to exert a downward compressive force on the pillow 20 to define the compressed insulation member 24.

Figure 10:
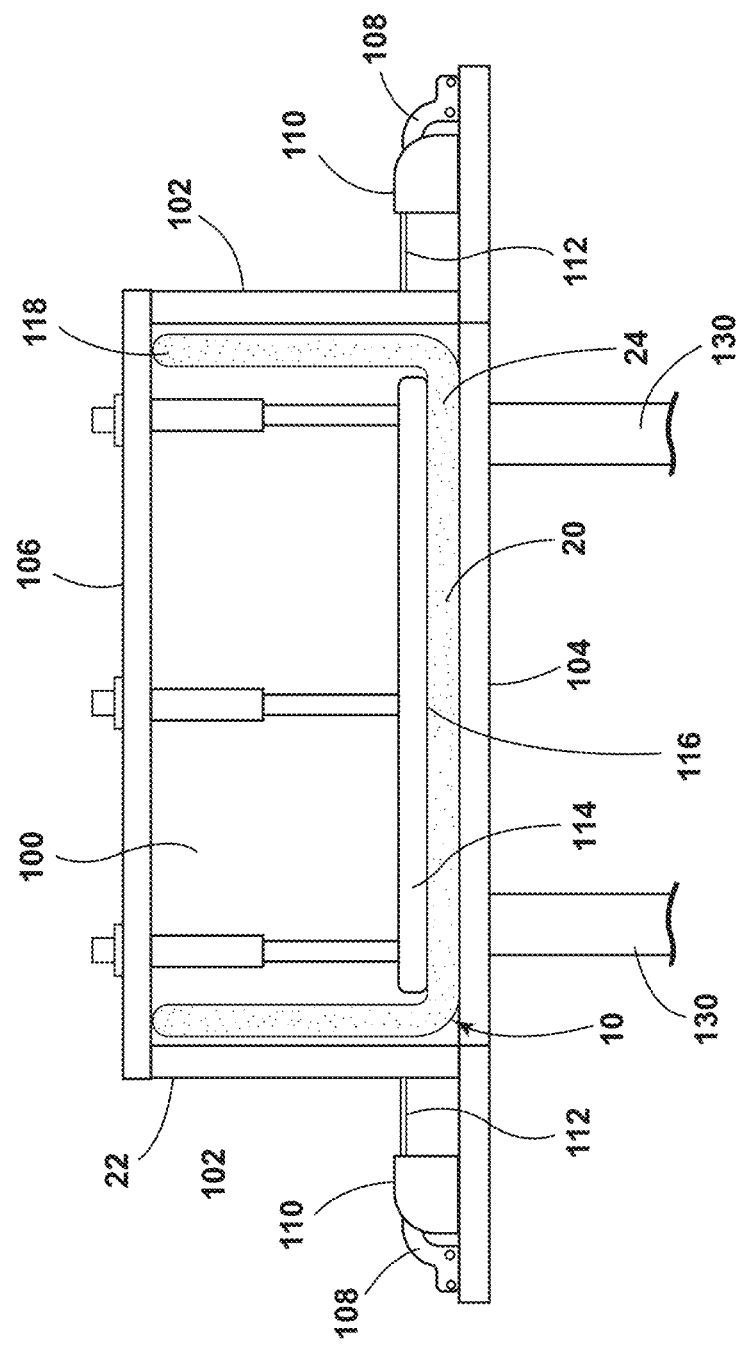
FIG. 10 is a cross-sectional side elevational view of the mold of FIG. 9 forming a compressed insulation member of the present disclosure.

As illustrated in FIG. 10, the press 114 compresses the center portion 116 of the pillow 20 to define a plurality of walls 118 of the compressed insulation member 24. The insulation member 10 may be configured within the mold 22 to have the multiple walls 118, such that the insulation member 10 can have a three-dimensional configuration. The formation of the walls 118 of the compressed insulation member 24 configures the compressed insulation member 24 to correspond with the insulation cavity 26. Stated differently, the compressed insulation member 24 may be formed into a three-dimensional structure that can generally correspond to the insulation cavity 26 defined between the liner 28 and the wrapper 30.

Figure 11:
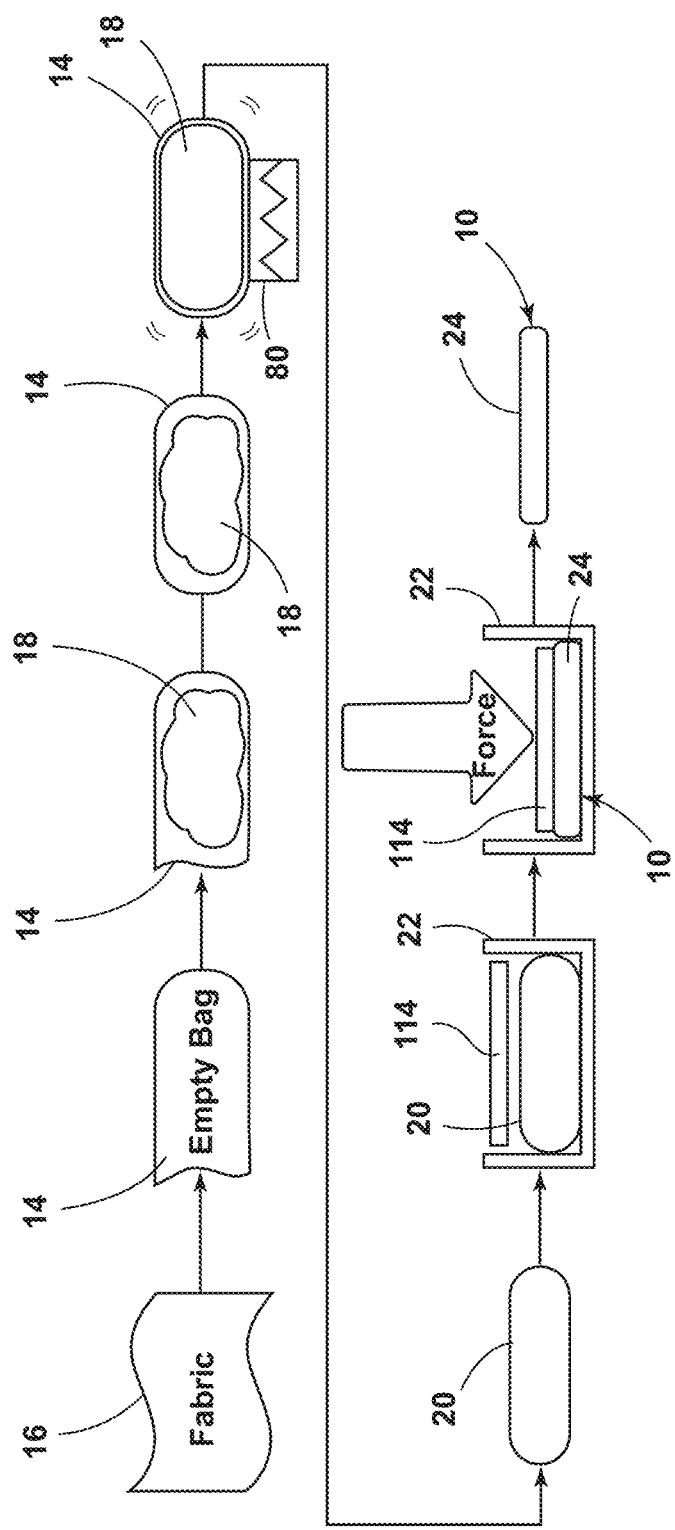
FIG. 11 is a schematic flow diagram of a process for manufacturing a compressed insulation panel of the present disclosure.
Figure 12:
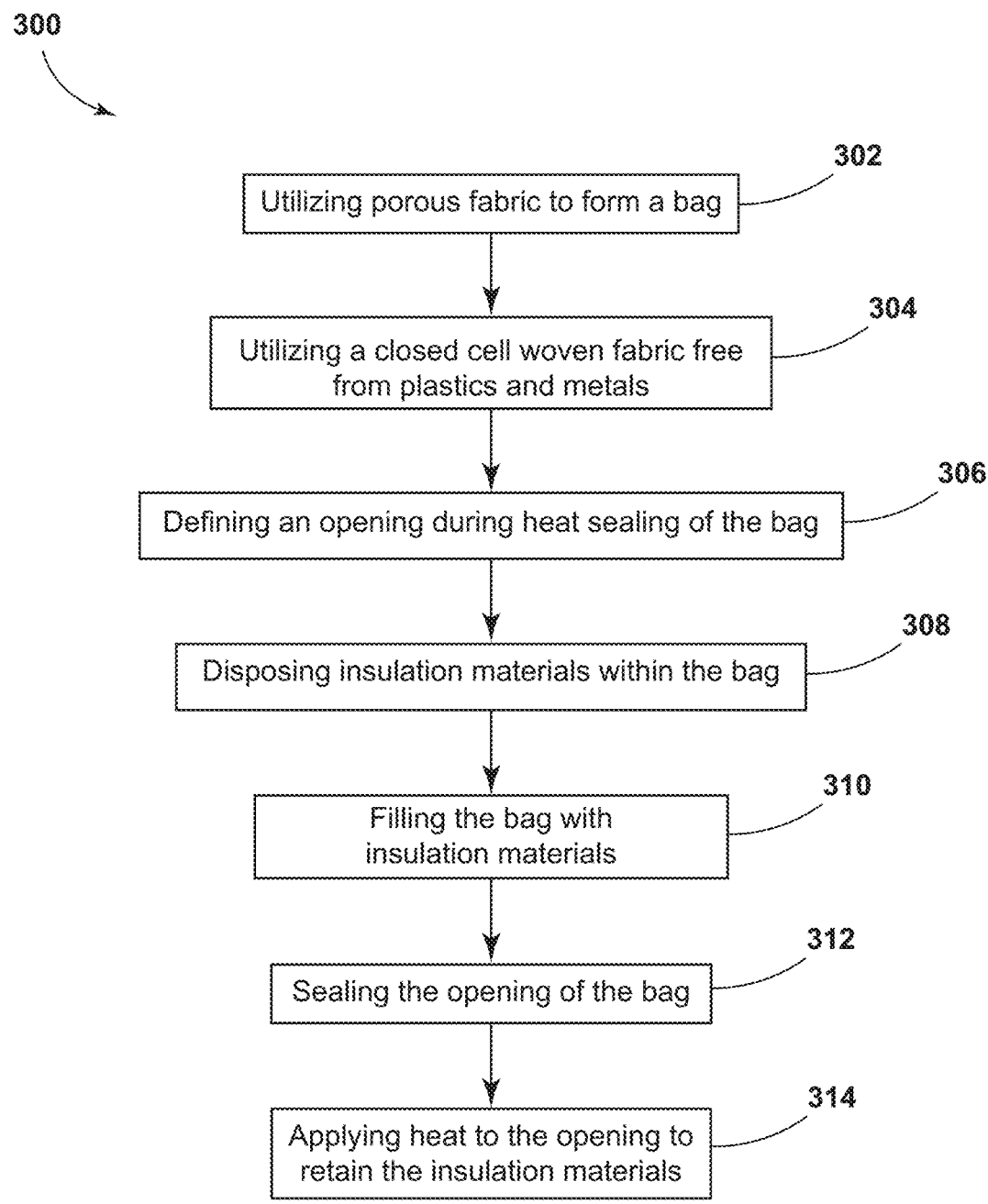
FIG. 12 is a flow diagram for a method for manufacturing an insulation member of the present disclosure.
Figure 13:
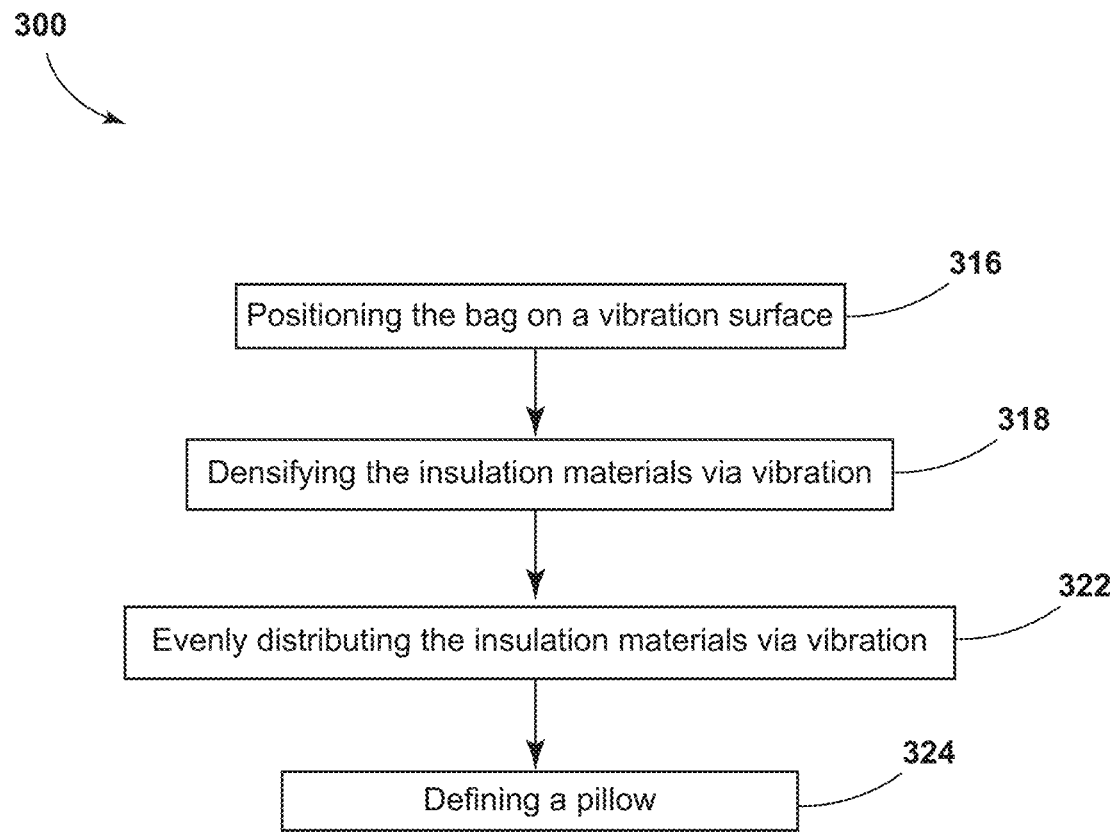
FIG. 13 is a flow diagram for the method for manufacturing the insulation member of FIG. 12.
Figure 14:
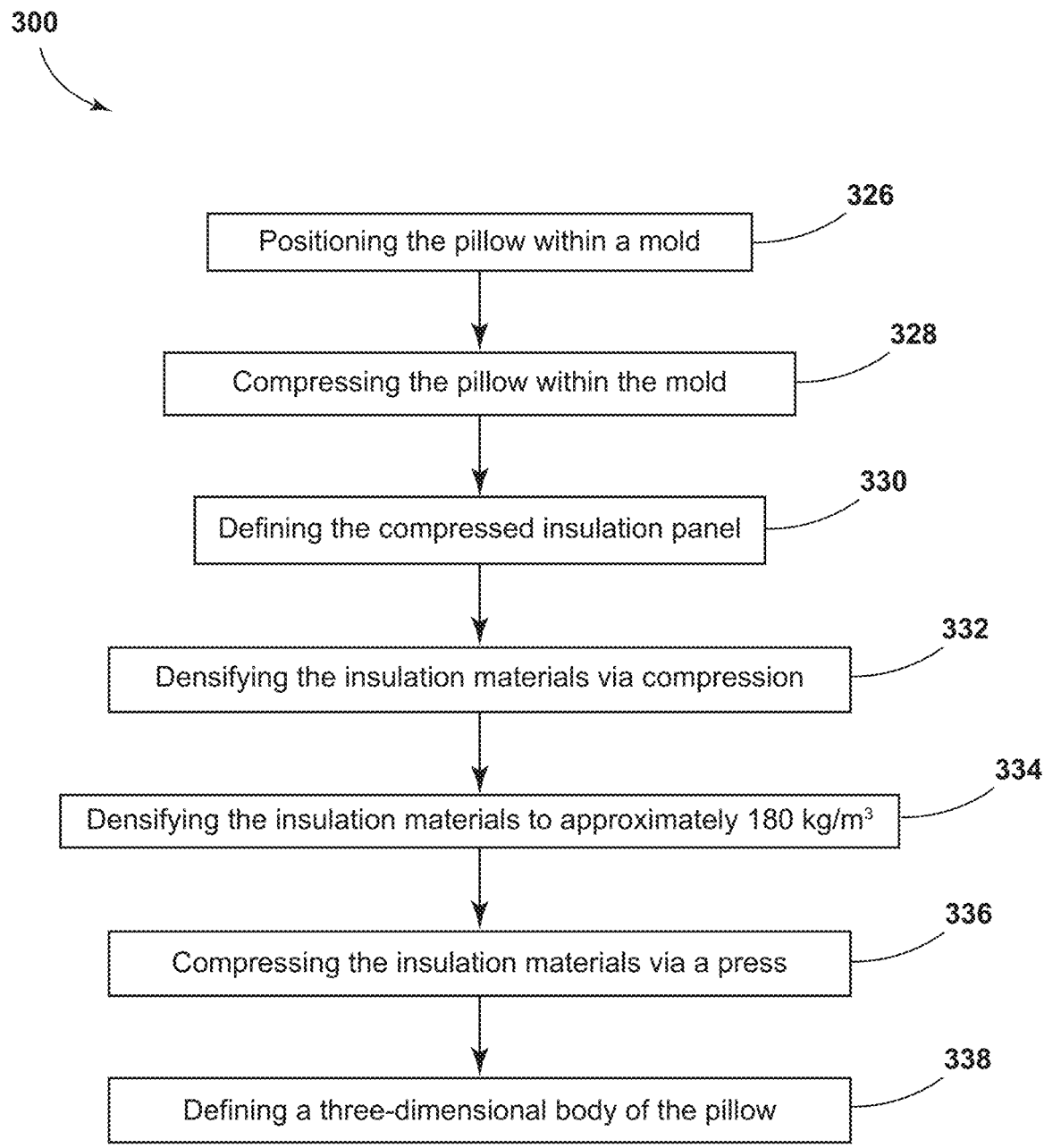
FIG. 14 is a flow diagram for the method for manufacturing the insulation member of FIG. 13.
Figure 15:
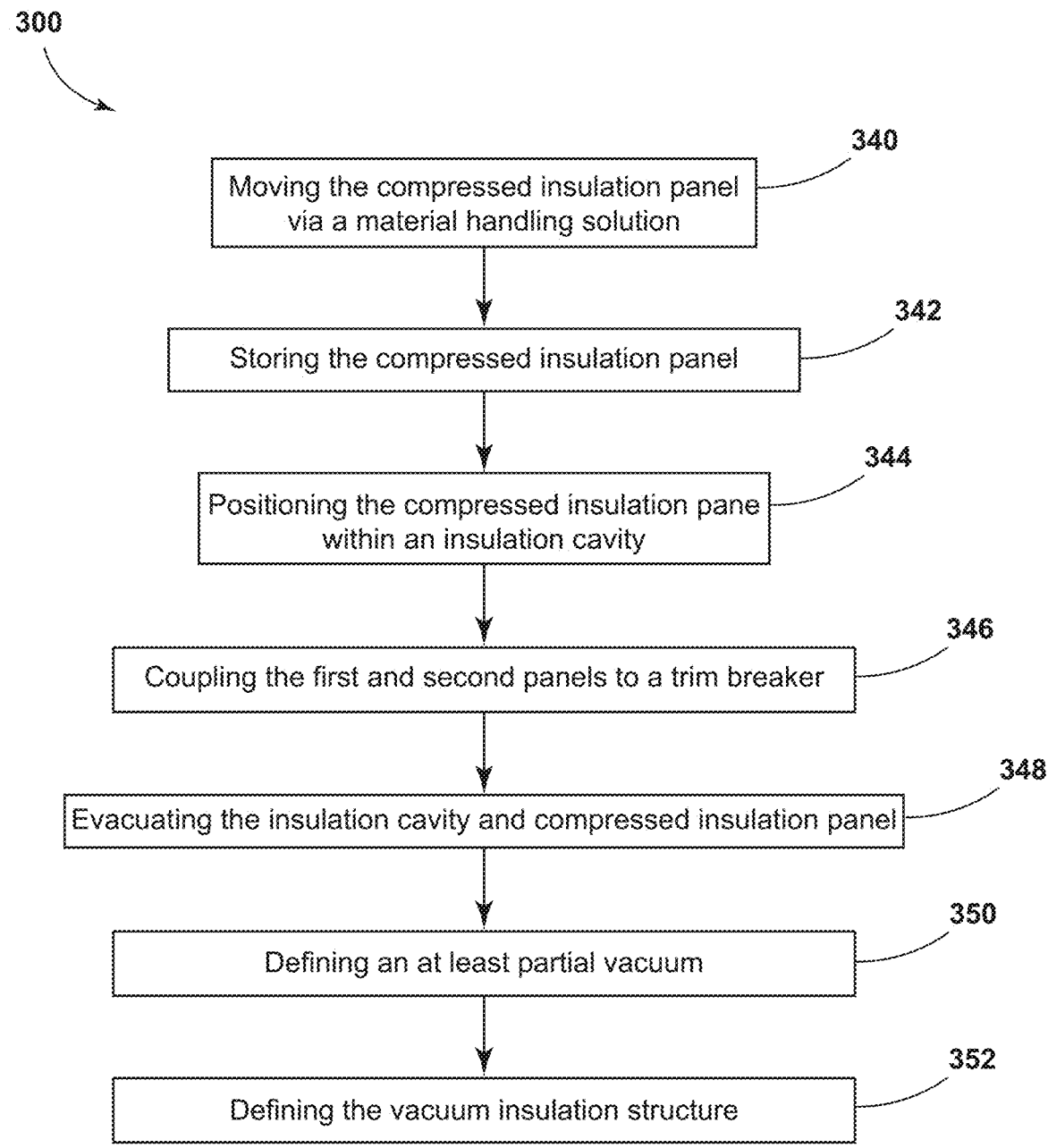
FIG. 15 is a flow diagram for the method for manufacturing the insulation member of FIG. 14.

Referring to FIGS. 8-11, the press 114 of the mold 22 can form the insulation member 10 into the compressed insulation panel 24, as schematically illustrated in FIG. 11. The mold 22 densifies the insulation member 10, such that the insulation materials 18 within the insulation member 10 may have a density ranging from approximately 150 kg/m$^3$ to approximately 350 kg/m$^3$. It is also contemplated that the density of the insulation materials 18 within the compressed insulation member 24 may have a density that is less than 150 kg/m$^3$ and/or greater than 350 kg/m$^3$. The density of the insulation materials 18 within the insulation member 10 generally depends on the density of the particular insulation material 18 used. The density of the insulation materials 18 can vary depending on the type of insulation materials 18 used to fill the bag 14, as mentioned above. The compressed insulation panel 24 can be utilized to insulate the door 42 of the appliance 40. It is also contemplated that the multiple compressed insulation panels 24 may be utilized within the insulation cavity 26 to insulate the appliance 40. For example, first, second, and third compressed insulation panels 24 may be used to line the insulation cavity 26 between the liner 28 and the wrapper 30.

The insulation member 10 is removed from the mold 22, prior to placement within the insulation cavity 26, via risers 130 that can be operably coupled to the base portion 104 of the mold 22. The risers 130 are configured to raise the compressed insulation member 24 out of the body 100 of the mold 22 to be transported to a storage location and/or for installation into the insulation cavity 26. It is generally contemplated that the compressed insulation member 24 is removed via a material handling solution. The material handling solution is configured to handle or otherwise manipulate the fragile compressed insulation member 24 with minimal abrasion or risk of damage to the compressed insulation member 24.

With further reference to FIGS. 8-11, the insulation member 10 can be stored within the storage location for future use within a vacuum insulated structure 12. As the compressed insulation member 24 remains free from evacuation, the compressed insulation member 24 can be stored for an extended period of time until desired use in a vacuum insulated structure 12. Once the vacuum insulated structure 12 is to be formed, the compressed insulated member 24, whether removed from the storage location or direct from the mold 22, can be disposed within the insulation cavity 26. The compressed insulation member 24 can be positioned within the insulation cavity 26 and is configured to provide and assist in the overall insulation and thermal regulation of the appliance 40. Once the compressed insulation m 24 is disposed within the insulation cavity 26, the compressed insulation member 24 can be evacuated.

The vacuum insulated structure 12 is configured with an evacuation port 132 (FIG. 4) to which a vacuum pump 134 (FIG. 4) may be coupled. As the vacuum is drawn, the air and/or other gasses that may be present in the insulation cavity 26 and/or the compressed insulation member 24 may be removed. It is generally contemplated that the bag 14 may further shrink or be compressed with the insulation materials 18 as the at least partial vacuum is defined within the insulation cavity 26. Similarly, the liner 28 and the wrapper 30 may generally compress or be articulated toward the compressed insulation member 24 to form the vacuum insulated structure 12. Once the at least partial vacuum is defined, the vacuum insulated structure 12 can be utilized with the appliance 40. As mentioned above, the compressed insulation member 24 and the vacuum insulated structure 12 can be utilized in the door 42 and/or the cabinet 44 of the appliance 40 to improve the overall thermal regulation of the appliance 40.

Referring again to FIGS. 1-15, a method 300 for manufacturing the insulation member 10 includes the following steps. The porous fabric 16 is selected and utilized to form the bag 14 via heat sealing the edges 70 of the first and second fabric portions 66, 68 (step 302). By way of example, not limitation, the closed-cell woven fabric that is free from plastics and metals can be used to form the bag 14 (step 304). The opening 64 is defined during the heat sealing formation of the bag 14 (step 306), and the insulation materials 18 are disposed in the bag 14 (step 308). It is generally contemplated that the hopper 74 or other distribution devices may be utilized to deposit the insulation materials 18 into the bag 14. By way of example, not limitation, the bag 14 may be filled with approximately 70 kg/m$^3$ of insulation materials 18 (step 310). Once the bag 14 is filled with the predetermined level of insulation materials 18, the opening 64 of the bag 14 can be sealed (step 312). It is contemplated that the opening 64 can be sealed via the heat sealing technique utilized in formation of the bag 14. Stated differently, heat can be applied to the opening 64 to retain the insulation materials 18 within the bag 14 (step 314).

The bag 14 containing the insulation materials 18 can be disposed on the vibration surface 82 once the opening 64 of the bag 14 has been sealed (step 316). The vibration surface 82 is configured to transmit vibration to the bag 14 and the insulation materials 18. The insulation materials 18 can be de-aerated and densified as a result of the vibration (step 318). It is also contemplated that the vibration of the vibration surface 82 can evenly distribute the insulation materials 18 within the bag 14 (step 322). The even distribution and the densification of the insulation materials 18 within the bag 14 defines the pillow 20 (step 324). Once the pillow 20 is defined and the insulation materials 18 are at least partially densified, the pillow 20 can be positioned within the mold 22 (step 326).

The pillow 20 can be compressed within the mold 22 (step 328) to define the compressed insulation panel 24 (step 330). The insulation materials 18 within the pillow 20 can be further densified by compression within the mold 22 (step 332). For example, the insulation materials 18 may be densified to approximately 180 kg/m$^3$ via compression within the mold 22 (step 334). It is generally contemplated that the insulation materials 18 can be compressed via the press 114 to increase the density of the insulation materials 18 within the bag 14 (step 336). The pillow 20 can be compressed to define a three-dimensional body that corresponds to the insulation cavity 26 of the vacuum insulated structure 12 (step 338). Stated differently, the pillow 20 can be compressed to define the compressed insulation member 24 with multiple walls 118.

Referring still to FIGS. 1-15, the compressed insulation panel 24 can be moved from the mold 22 via the material handling solution (step 340). It is contemplated that the compressed insulation panel 24 can be stored until use within the vacuum insulated structure 12 (step 342) and/or can be positioned within the insulation cavity 26 defined between the first panel 28 and the second panel 30 (step 344). Once the vacuum insulated structure 12 is to be formed, the compressed insulation panel 24 can be positioned within the insulation cavity 26. The compressed insulation panel 24 can be positioned between the first and second panels 28, 30, and the first and second panels 28, 30 can be coupled via the trim breaker 50 (step 346). The insulation cavity 26 and the compressed insulation panel 24 can then be evacuated with the vacuum pump 134 via the evacuation port 132 (step 348) to define the at least partial vacuum within the insulation cavity 26 (step 350). The evacuation of the insulation cavity 26 and the compressed insulation panel 24 defines the vacuum insulated structure 12 (step 352).

The invention disclosed herein is further summarized in the following paragraphs and is further characterized by combinations of any and all of the various aspects described therein.

According to one aspect of the present disclosure, a method for manufacturing an insulation member for a vacuum insulated structure includes the step of forming a bag with a single layer porous fabric, wherein the bag is free from metallic and plastic films. The method further includes the steps filling the bag with insulation materials, sealing the insulation materials within the bag, vibrating the insulation materials and the bag to define a pillow, compressing the pillow within a mold to define a compressed insulation panel, positioning the compressed insulation panel in an insulation cavity that is defined between a first panel and a second panel, and evacuating the insulation cavity and the compressed insulation panel to define said vacuum insulated structure.

According to another aspect, a bag includes a closed-cell woven fabric.

According to another aspect, the step of sealing insulation materials within a bag includes applying heat to an opening that is defined by the bag to retain the insulation materials within the bag.

According to another aspect, the step of filling a bag includes filling the bag with approximately 70 kg/m³ of insulation materials.

According to another aspect, the step of densifying insulation materials includes compressing the insulation materials with a press to increase the density of the insulation materials within a bag.

According to another aspect, the step of densifying insulation materials includes compressing the insulation materials to a density of approximately 180 kg/m³.

According to another aspect of the present disclosure, a method for manufacturing an insulation member for an appliance includes the steps of forming a porous bag with a woven fabric, filling the porous bag with insulation materials, heat sealing the porous bag, vibrating the porous bag to define a pillow, compressing the pillow within a mold to define a compressed insulation member, and evacuating the compressed insulation member within an insulated structure to define a vacuum insulated structure.

According to another aspect, the step of compressing a pillow within a mold further includes defining a three-dimensional body that corresponds to an insulation cavity of the vacuum insulated structure.

According to another aspect, the step of vibrating a porous bag further includes de-aerating insulation materials within the porous bag.

According to another aspect, the step of forming a porous bag includes utilizing a fabric material that is free from a plastic coating or a metal coating.

According to another aspect, the step of forming a porous bag includes utilizing a closed-cell woven fabric.

According to another aspect, the step of compressing a pillow includes defining multiple walls of a compressed insulation member that correspond to an insulated structure.

According to another aspect, the step of vibrating a porous bag further includes distributing evenly insulation materials within the porous bag, and densifying the insulation materials within the porous bag.

According to yet another aspect of the present disclosure, a method for manufacturing a vacuum insulated structure for an appliance includes the steps of forming a porous bag containing insulation materials, densifying the insulation materials to define a pillow, compressing the pillow to define a compressed insulation member, disposing the compressed insulation member within an insulation cavity that is defined between a wrapper and a liner, and evacuating the compressed insulation member and the insulation cavity to define an at least partial vacuum.

According to another aspect, the step of forming a porous bag includes heat sealing a closed-cell woven fabric to define the porous bag, filling the porous bag with insulation materials via an opening of the porous bag, and heat sealing the opening of the porous bag.

According to another aspect, the step of densifying insulation materials includes vibrating a porous bag and the insulation materials on a vibration surface.

According to another aspect, the step of compressing a pillow includes inserting the pillow into a mold.

According to another aspect, the step of compressing a pillow further includes compressing the pillow within a mold to define a multi-walled compressed insulation member.

According to another aspect, the step of forming a porous bag includes utilizing a fabric material that is free from a plastic film and a metal film.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for manufacturing an insulation member for a vacuum insulated structure, comprising the steps of:
    forming a bag with a single layer porous fabric, wherein the bag is free from metallic and plastic films;
    filling the bag with insulation materials;
    sealing the insulation materials within the bag;
    vibrating the insulation materials and the bag to define a pillow;
    compressing the pillow within a mold to define a compressed insulation panel;
    positioning the compressed insulation panel in an insulation cavity defined between a first panel and a second panel; and
    evacuating the insulation cavity and the compressed insulation panel to define said vacuum insulated structure.

2. The method of claim 1, wherein the bag comprises a closed-cell woven fabric.

3. The method of claim 1, wherein the step of sealing the insulation materials within the bag includes applying heat to an opening defined by the bag to retain the insulation materials within the bag.

4. The method of claim 1, wherein the step of filling the bag includes filling the bag with approximately 70 kg/m³ of the insulation materials.

5. The method of claim 1, wherein the step of vibrating the insulation materials includes densifying the insulation materials and distributing the insulation materials evenly within the bag.

6. The method of claim 5, wherein the step of densifying the insulation materials includes compressing the insulation materials with a press to increase a density of the insulation materials within the bag.

7. The method of claim 5, wherein the step of densifying the insulation materials includes compressing the insulation materials to a density of approximately 180 kg/m³.

8. A method for manufacturing an insulation member for an appliance, comprising the steps of:
    forming a porous bag with a woven fabric;
    filling the porous bag with insulation materials;
    heat sealing the porous bag;
    vibrating the porous bag to define a pillow;
    compressing the pillow within a mold to define a compressed insulation member; and
    evacuating the compressed insulation member within an insulated structure to define a vacuum insulated structure.

9. The method of claim 8, wherein the step of compressing the pillow within the mold further includes defining a three-dimensional body that corresponds to an insulation cavity of the vacuum insulated structure.

10. The method of claim 8, wherein the step of vibrating the porous bag further includes de-aerating the insulation materials within the porous bag.

11. The method of claim 8, wherein the step of forming the porous bag includes utilizing a fabric material that is free from a plastic coating or a metal coating.

12. The method of claim 8, wherein the step of forming the porous bag includes utilizing a closed-cell woven fabric.

13. The method of claim 8, wherein the step of compressing the pillow includes defining multiple walls of the compressed insulation member that correspond to the insulation structure.

14. The method of claim 8, wherein the step of vibrating the porous bag further includes:
    distributing evenly the insulation materials within the porous bag; and
    densifying the insulation materials within the porous bag.

15. A method for manufacturing a vacuum insulated structure for an appliance, comprising the steps of:
    forming a porous bag containing insulation materials;
    densifying the insulation materials to define a pillow;
    compressing the pillow to define a compressed insulation member;
    disposing the compressed insulation member within an insulation cavity defined between a wrapper and a liner; and
    evacuating the compressed insulation member and the insulation cavity to define an at least partial vacuum.

16. The method of claim 15, wherein the step of forming the porous bag includes:
    heat sealing a closed-cell woven fabric to define the porous bag;
    filling the porous bag with the insulation materials via an opening of the porous bag; and
    heat sealing the opening of the porous bag.

17. The method of claim 15, wherein the step of densifying the insulation materials includes vibrating the porous bag and the insulation materials on a vibration surface.

18. The method of claim 15, wherein the step of compressing the pillow includes inserting the pillow into a mold.

19. The method of claim 18, wherein the step of compressing the pillow further includes compressing the pillow within the mold to define a plurality of walls of the compressed insulation member.

20. The method of claim 15, wherein the step of forming the porous bag includes utilizing a fabric material that is free from a plastic film and a metal film.

* * * * *